No. 687,086. Patented Nov. 19, 1901.
F. N. UPHAM.
MULTICOLORED RUBBER MAT.
(Application filed May 9, 1901.)
(No Model.)
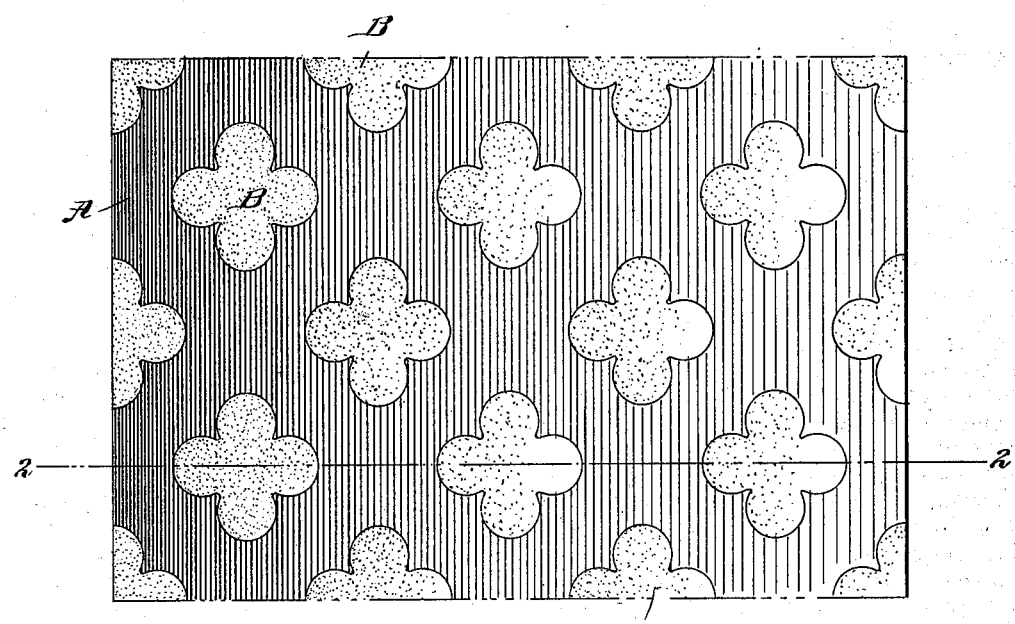
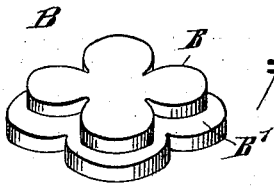
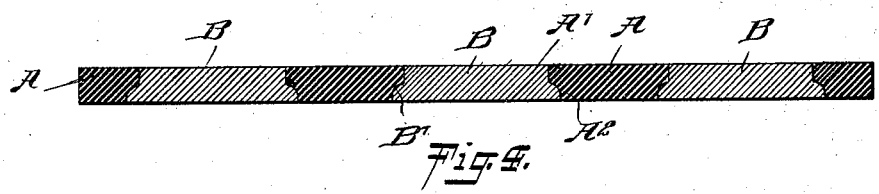
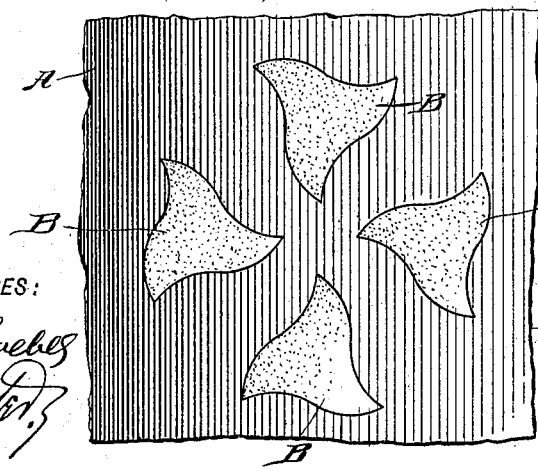
WITNESSES:
INVENTOR
Frederic N. Upham
BY Munn & Co.
ATTORNEYS

UNITED STATES PATENT OFFICE.

FREDERIC N. UPHAM, OF BROOKLYN, NEW YORK.

MULTICOLORED RUBBER MAT.

SPECIFICATION forming part of Letters Patent No. 687,086, dated November 19, 1901.

Application filed May 9, 1901. Serial No. 59,395. (No model.)

*To all whom it may concern:*

Be it known that I, FREDERIC N. UPHAM, a citizen of the United States, and a resident of the city of New York, borough of Brooklyn, in the county of Kings and State of New York, have invented certain new and useful Improvements in Multicolored Rubber Mats, of which the following is a full, clear, and exact description.

The object of the invention is to provide a new and improved multicolored rubber mat constructed to present at all times a very smooth walking-surface, to insure even wear, and arranged to hold the inlaid rubber tiles securely in place in the rubber sheet or plate, so that when the rubber mat is in use the inlaid pieces cannot work up in the sheet and be broken and forced out by persons walking on the mat.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement. Fig. 2 is a sectional side elevation of the same on the line 2 2 in Fig. 1. Fig. 3 is a perspective view of one of the inlaid rubber tiles; and Fig. 4 is a plan view of the improvement, showing a different design.

The improved multicolored rubber mat consists, essentially, of a rubber sheet or plate A of one color, and inlaid rubber tiles B of the same material and consistency as the sheet or plate A, but of a different or contrasting color. The tiles B are flush at their top and bottom faces with the top and bottom surfaces of the sheet A, as plainly illustrated in Fig. 2. The sheet or plate A is formed with apertures A', shaped according to a predetermined design, the rubber tiles B being correspondingly formed to snugly fit said apertures A'. The lower or bottom portions $A^2$ of the apertures A' are annularly enlarged to form annular shoulders and to snugly receive annular retaining-flanges B', formed on the lower edges of the rubber tiles B, and in order to secure the rubber tiles in place in the sheet A a suitable cement is used between the walls of the apertures and the edges of the tiles.

In manufacturing the rubber mat I proceed as follows: A mold the size of a mat is provided with raised cores set on the bottom of the mold and spaced apart according to a predetermined design and shaped at their edges to conform to the walls of the apertures to be made in the sheet A, and into this mold is laid the unvulcanized rubber to the required depth—that is, to the thickness of the rubber mat to be produced. The sheet or plate of rubber is then vulcanized in the mold and then removed therefrom, and the rubber tiles B, made in the same manner in an opposite mold, are cemented into the apertures of the rubber sheet, as above described.

When the rubber mat is in use, the flanged portion of the rubber tiles B are at the bottom and rest on the floor, and the retaining-flange B' by abutting against the shoulders formed by enlarging the apertures A', as described, prevent the inlaid rubber tiles from moving upward, so that the inlaid rubber tiles cannot work loose and are always flush with the top surface of the sheet A, and consequently a uniform wear of the inlaid rubber tiles and rubber sheet is had.

A mat constructed in the manner described can be used until worn through to the bottom. The edges of the sheet or plate A may be provided with the usual fastening—such as a tongue and groove, interlocking tongues, &c.—for fastening a number of sheets or plates together, and as the latter are all of the same color the joint does not affect the design and mar the appearance of the article.

It is understood that the inlaid rubber tiles may be made in any desired shape or color, so as to readily contrast with the background formed by the sheet or plate A, and thereby give the multicolored rubber mat a very fine appearance. It is understood that any desired color can be given to the sheet or plate A.

Having thus fully described my invention, I claim as new and desire to secure by Letters Patent—

1. A mat, comprising a sheet of resilient material provided with apertures, and tiles of resilient material located in said apertures and extending entirely through the sheet, so as to be flush with both the top and bottom surfaces thereof.

2. A mat, comprising a sheet of resilient material, and provided with apertures extending entirely through the same, said apertures being of differential area at the top and bottom surfaces of the sheet, and tiles located in said apertures and mating the same.

3. A mat, comprising a sheet of resilient material provided with apertures, and tiles located in said apertures, said tiles having opposite faces similar in shape but different in size.

4. A multicolored rubber mat, consisting of a fully-vulcanized rubber sheet having apertures arranged according to a predetermined design, and fully-vulcanized rubber tiles fitting the said apertures and secured to and contrasting with the said sheet, the said rubber tiles being flush on top and bottom with the top and bottom of the said sheet, and the said tiles having retaining-flanges abutting against shoulders in the sheet, as set forth.

5. A multicolored rubber mat, comprising a sheet of one color having apertures arranged according to a predetermined design and enlarged at the bottom portions to form shoulders, and rubber tiles of another color fitting said apertures and having their bottom parts formed with retaining-flanges fitting the walls of the enlarged portions of said apertures and abutting against said shoulders, the top and bottom faces of the inlaid rubber tiles being flush with the top and bottom surfaces of the sheet, as set forth.

6. A multicolored rubber mat, comprising a sheet having apertures arranged according to a predetermined design and enlarged at the bottom portions to form shoulders, rubber tiles of another color fitting said apertures and having their bottom parts formed with retaining-flanges fitting the walls of the enlarged portions of said apertures and abutting against said shoulders, the top and bottom faces of the rubber tiles being flush with the top and bottom surfaces of the sheet, and an adhesive substance between the walls of the apertures and the edges of the rubber tiles, to permanently secure the latter in place in the sheet, as set forth.

7. A multicolored rubber mat, comprising a sheet of rubber, provided with apertures having a general clover-leaf shape, and provided with undercut portions to afford anchorage, and tiles of corresponding shape located in said apertures and provided with projections engaging said undercut portions.

In testimony whereof I have signed my name to this specification in the presence of two subscribing witnesses.

FREDERIC N. UPHAM.

Witnesses:
LEWIS L. SCOTT,
F. DONNELLY.